United States Patent Office 3,002,811
Patented Oct. 3, 1961

3,002,811
METHOD OF PURIFYING ALKALI
METAL IODIDES
Irwin E. Johnson, Parma, Ohio, assignor to The Harshaw Chemical Company, Cleveland, Ohio, a corporation of Ohio
No Drawing. Filed May 28, 1959, Ser. No. 816,368
9 Claims. (Cl. 23—89)

This invention relates to a new method for the purification of alkali metal iodides such as lithium iodide, cesium iodide and rubidium iodide.

The invention has particular significance where the alkali metal iodide is used in the preparation of scintillation crystals. Sodium iodide has been found to produce suitable optical crystals which are especially useful when employed as scintillation crystals. However, as scintillation crystals are used as sensing devices for radiation energy, every effort must be made to reduce the amount of radioactive material contained in the scintillation crystal itself. Sodium iodide and related alkali metal iodides contain potassium impurities which, in turn, contain quantities of a natural radioactive isotope $K^{40}$ which emits both beta and gamma radiation. The presence of potassium is objectionable to such an extent that the contamination of sodium iodide with only a few parts per million of potassium will render a scintillation crystal produced from such materials unserviceable for certain applications.

It is, therefore, an object of this invention to purify alkali metal iodides. It is another object of this invention to purify alkali metal iodides by the removal of potassium contaminants.

It is still another object of this invention to prepare sodium iodide scintillation crystals substantially free from radioactive potassium impurities.

The alkali metal iodide starting materials refined by the process of this invention are C.P. grades of alkali metal iodides which usually contain contaminating potassium impurities of the order of about 10 parts per million to 15 parts per million, although by present industrial standards this value may be less than 10 parts per million or as high as 100 parts per million. U.S.P. grades of alkali metal iodides may also be used if the potassium is in the desired range. The alkali metal iodide starting material is purified by first dissolving in a liquor consisting of water and hydriodic acid and then crystallizing from said liquor, whereby purified alkali metal iodide crystals are formed, while substantial proportions of said potassium contaminants remain in the resulting mother liquor.

The basic procedure has been divided into three major variations depending upon the expenditure of hydriodic acid and the degree of purity desired in the final product. In the first variation of the basic procedure the alkali metal iodide is merely dissolved in hot aqueous hydriodic acid of a preferred concentration of about 43%, although other commercially available grades of aqueous concentrations from about 40% to 55% may be employed. The alkali metal iodide solution is then cooled to about 30° C., whereupon a crop of alkali metal iodide crystals will separate out. In the second variation of the basic procedure an aqueous solution of alkali metal iodide is boiled until a saturated solution is produced. Hydriodic acid is then added until a pH of about 1.0 is reached. The solution is then cooled to about 30° C., whereupon a crop of alkali metal iodide crystals will separate out. The third variation of the basic procedure embodies the formation of a solution of alkali metal iodide in water and the lowering of the pH to about 1.0 by the addition of hydriodic acid. The solution is then evaporated by boiling until the saturation point is reached. At this point additional hydriodic acid is added, the quantity of which may vary from 5% to 25% of the volume of the saturated alkali metal iodide solution according to the purity of the final product desired. The solution is then left to cool to about 30° C., whereupon a crop of alkali metal iodide crystals is separated.

The following are specific examples of the various purification processes for alkali metal iodides.

*Variation I*

(A) Starting materials:
 Sodium iodide containing 16 p.p.m. potassium
 Hydriodic acid 43%

60 g. NaI were dissolved in 45 ml. HI (43%) hot. Solution was cooled to about 30° C. whereupon a crop of crystals, largely $NaI\cdot 2H_2O$, separated. These were drained of acid mother liquor and samples of crystals (product) dried. Sample of acid mother liquor was evaporated to dryness. Potassium analysis:

|  | P.p.m. |
|---|---|
| NaI product | 7.0 |
| NaI from acid mother liquor | 60.0 |

(B) Starting materials:
 NaI containing 30 p.p.m. potassium
 HI (43%)

800 g. NaI were dissolved in 600 ml. hot HI plus 5 ml. $H_2O$. Charge was cooled to about 30° C. whereupon a crop of crystals, largely $NaI\cdot 2H_2O$ separated. These were filtered from the acid mother liquor. Sample of crystals was dried and analyzed. Potassium content of dry product (NaI)—0.4 p.p.m.

(C) Starting materials:
 NaI containing 6.2 p.p.m. potassium
 HI 42%

800 g. NaI were dissolved in 600 ml. hot HI (42%) plus 10 ml. $H_2O$. Solution was cooled to about 30° C. whereupon a crop of crystals, largely $NaI\cdot 2H_2O$, separated. These were filtered from the acid mother liquor. Sample of crystals (product) was dried and analyzed. Sample of acid mother liquor was evaporated to dryness and analyzed. Potassium analysis:

|  | P.p.m. |
|---|---|
| NaI product | 1.5 |
| NaI from acid mother liquor | 41.0 |

(D) Starting materials:
 Cesium iodide containing 485 p.p.m. potassium
 C.P. Hydriodic acid 48%

500 grams of CsI were dissolved in a minimum amount of water. 50 ml. of 48% HI was then added. The solution was evaporated by boiling until an appreciable mass of CsI crystals were produced. The charge was cooled to about 30° C. and then filtered. The yield of dry CsI crystals was 376 g. A sample of the acid mother liquor was evaporated to dryness and analyzed. Potassium analysis:

|  | P.p.m. |
|---|---|
| Starting CsI stock | 485 |
| Crystal product | 93 |
| CsI from acid mother liquor | 2090 |

NOTE: In above experiments "hot" solutions of HI for dissolving NaI were in the range of 85° C. to 95° C. Filtrations were made on fritted glass funnels. HI used was of C.P. quality but varied in strength as indicated in the preceding and following experiments.

Variation II

Starting materials:
 NaI containing 64 p.p.m. potassium
 HI 48%

800 g. NaI were dissolved in water and filtered. HI was added until solution pH was lowered to 1.0. Solution was evaporated by boiling until saturated, then cooled to about 30° C. whereupon a crop of crystals, largely NaI.2H$_2$O, separated. These were filtered from mother liquor and a sample was taken, dried and then analyzed for potassium. Analysis dry product: 29.8 p.p.m. potassium.

Variation III (A) Starting materials:
 NaI containing 64 p.p.m. potassium
 HI 48%

800 g. NaI were dissolved in water and filtered. HI was added until solution pH was lowered to 1.0±0.1. Solution was evaporated by boiling until saturated. At this point volume of saturated solution was determined and to this solution there was added HI (48%)—45 ml., equal in volume to 10% of the saturated solution volume. Hot solution was well mixed and left to cool to about 30° C. whereupon a crop of crystals, largely NaI.2H$_2$O, separated. These were filtered from mother liquor. Sample of crystals was taken, dried and analyzed for potassium. Analysis dry product (NaI)—6.0 p.p.m. potassium.

(B) Starting materials:
 NaI containing 64 p.p.m. potassium
 HI 48%

800 g. NaI containing 64 p.p.m. potassium were dissolved in water and filtered. HI was added until solution pH was lowered to 1.0±0.1. The solution was evaporated by boiling until saturated. HI (48%) was immediately added with mixing in an amount by volume equal to 25% of the volume of the saturated NaI solution. Product was left to cool to about 30° C. whereupon crystals, largely NaI.2H$_2$O separated. These were filtered and sample taken, dried and analyzed for potassium. Analysis dry product (NaI)—4.5 p.p.m.

(C) Starting materials:
 NaI, low in potassium to which KI was added for an appropriate concentration of 10 p.p.m. potassium
 HI 46%

4.0 kg. NaI were dissolved in water and filtered. HI was added until pH of solution reached 1.0±0.1. Solution was evaporated by boiling until saturated. HI (48%) was immediately added, with mixing, in an amount by volume equal to 10% of the volume of the saturated NaI solution. Product was left to cool to about 30° C., whereupon a crop of crystals, largely NaI.2H$_2$O, separated. These were filtered and sample taken, dried and analyzed for potassium. Also sample of acid mother liquor was taken, evaporated to dryness and analyzed for potassium.

|  | P.p.m. potassium |
|---|---|
| Analysis starting material containing added KI | 8.3 |
| Analysis dry product (NaI) | 1.4 |
| Analysis NaI from acid mother liquor | 32.4 |

(D) Starting materials:
 NaI containing 9.7 p.p.m. potassium
 HI 47%

1.0 kg. NaI was dissolved in distilled water and filtered. HI was added until pH of solution reached 1.0±0.1. Solution was evaporated by boiling until saturated. HI (47%) was immediately added, with mixing, in an amount equal to 10% by volume of the volume of the saturated NaI solution. Product was left to cool to about 30° C., whereupon a crop of crystals, largely NaI.2H$_2$O, separated. These were drained (not filtered) from acid mother liquor. Sample of drained crystals was taken, dried and analyzed for potassium.

|  | P.p.m. potassium |
|---|---|
| Analysis dry product (NaI) | 4.0 |

(E) Starting materials:
 NaI containing 9.7 p.p.m. potassium
 HI 47%

1.0 kg. NaI was dissolved in distilled water and filtered. HI was added until pH of solution reached 1.0±0.1. Solution was evaporated by boiling until saturated. HI (47%) was immediately added, with mixing, in an amount equal in volume to 10% of the volume of the saturated NaI solution. Product was left to cool to about 30° C., whereupon a crop of crystals, largely NaI.2H$_2$O, separated. These were filtered from acid mother liquor. Sample of filtered crystals were taken, dried and analyzed for potassium.

|  | P.p.m. potassium |
|---|---|
| Analysis dry product (NaI) | 0.6 |

(F) 500 g. LiI was dissolved in water and potassium iodide was added thereto. A sample of the solution was analyzed for potassium. pH of the LiI charge was adjusted to 1.0 using HI 48% C.P. The acid solution was evaporated by boiling to the point where a yield of about 70% of the starting batch could be obtained when charge was cooled to 30° C. While still hot there was added to the charge HI 48% C.P. equal in volume to 10% of the volume of the evaporated LiI solution. The charge was set aside to cool and crystallize, whereupon a crop of crystals (LiI.3H$_2$O) separated. Crystals were separated by filtration from the acid mother liquor. A sample of the acid mother liquor was evaporated to dryness. Finally all samples were completely dehydrated and analyzed for potassium. Potassium analysis:

|  | P.p.m. |
|---|---|
| Starting LiI to which KI was added | K=62 |
| Crystal product (LiI) | K=5.8 |
| LiI from acid mother liquor | K=77 |

In summary of the various procedures, all of the procedures require the presence of hydriodic acid. If the raw sodium iodide contains 8 to 10 p.p.m. potassium and a product which contains less than 5 p.p.m. potassium is required, the procedure outlined in Variation II may be employed. Where, however, more effective potassium removal is desired, the procedure outlined in Variation III is required. It should also be noted that the effectiveness of potassium removal of the various procedures is increased where the mother liquor is removed by filtration rather than resorting to drainage for removal of the mother liquor. A centrifuge has been found to be especially valuable in the removal of mother liquor.

Various considerations determine the amount of hydriodic acid employed in the procedures. It has been found that due to the common ion effect, an increased yield of alkali metal iodide will result where higher hydriodic acid concentrations are employed. In general, the alkali metal iodide product yield will vary from about 45% to about 85% of the starting product depending on the amount of hydriodic acid employed. The expense of hydriodic acid is also an important consideration and where large amounts are employed, it is usually advisable to recover the acid. It has been found that as much as 75% of the amount of hydriodic acid originally introduced may be recovered.

The procedures of this invention have been found to be useful in removing impurities other than potassium from alkali metal iodides and in this respect the procedures may be regarded as general purification methods for the purification of alkali metal iodides. Table I discloses the purification of three samples of sodium iodide. Analytical data on the impurities of product and the impurities removed via the mother liquor were obtained from an emission spectrograph.

TABLE I

|  | Experiment A | | Experiment B | | Experiment C | |
| --- | --- | --- | --- | --- | --- | --- |
|  | Product Analysis | Acid Mother Liquor | Product Analysis | Acid Mother Liquor | Product Analysis | Acid Mother Liquor |
| Aluminum | FT+ | W/T | FT+ | W/T | FT+ | T |
| Barium |  | W |  |  |  |  |
| Calcium | VFT | T | VFT | FT | VFT/FT | T/FT |
| Copper | VFT | VFT | VFT | VFT | VFT | FT |
| Iron | VFT– | VFT | VFT– | VFT– | VFT– | VFT |
| Magnesium | FT | FT | VFT | VFT+ | VFT | FT |
| Silicon | FT– | T | VFT | T– | VFT | T– |

Approx. values:
 W=Weak, 0.01 to 1%.
 T=Trace, 0.001 to 0.01%.
 T–=Somewhat less than trace.
 FT=Faint trace.
 VFT=Very faint trace.

Having thus described my invention, what I claim is:

1. A method for the purification of potassium contaminated alkali metal iodide selected from the group consisting of lithium iodide, sodium iodide, cesium iodide and rubidium iodide wherein the contaminated alkali metal iodide is first dissolved in a hot liquor consisting of water and hydriodic acid and then crystallized from said liquor by cooling to about 30° C., whereby purified alkali metal iodide crystals are formed while substantial proportions of said contaminants remain in the resulting mother liquor.

2. The method of claim 1 wherein the alkali metal iodide is sodium iodide.

3. The method of claim 2 wherein the contaminating potassium is initially present in amounts not exceeding 100 p.p.m.

4. A method for the purification of potassium contaminated alkali metal iodide selected from the group consisting of lithium iodide, sodium iodide, cesium iodide and rubidium iodide wherein the contaminated alkali metal iodide is first dissolved in substantially pure water, the aqueous solution boiled until a saturated solution is produced, hydriodic acid added to the saturated solution until a pH of 1.0 is reached and then crystallization is induced by cooling the solution to about 30° C., whereby purified alkali metal iodide crystals are formed while substantial proportions of said contaminants remain in the resulting mother liquor.

5. The method of claim 4 wherein the alkali metal iodide is sodium iodide.

6. The method of claim 5 wherein the contaminating potassium is initially present in amounts not exceeding 100 p.p.m.

7. A method for the purification of a potassium contaminated alkali metal iodide selected from the group consisting of lithium iodide, sodium iodide, cesium iodide and rubidium iodide, wherein the contaminated alkali metal iodide is first dissolved in substantially pure water, the pH of the solution lowered to about 1.0, the solution evaporated by boiling until the saturation point is reached, an amount of a 48% solution of hydriodic acid equal to from 5% to 25% of the volume of the saturated sodium iodide is added and then crystallization is induced by cooling the solution to about 30° C., whereby purified alkali metal iodide crystals are formed while substantial proportions of said contaminants remain in the resulting mother liquor.

8. The method of claim 7 wherein the alkali metal iodide is sodium iodide.

9. The method of claim 8 wherein the contaminating potassium is initially present in amounts not exceeding 100 p.p.m.

References Cited in the file of this patent

UNITED STATES PATENTS

| 2,415,346 | Farr | Feb. 4, 1947 |
| 2,640,755 | Hay | June 2, 1953 |